Oct. 24, 1950    M. FISHBEIN    2,526,941
GAS TURBINE SYSTEM FOR AIRCRAFT PROPULSION
Filed June 10, 1948    4 Sheets-Sheet 1

INVENTOR.
MEYER FISHBEIN
BY Herbert E. Metcalf
Attorney

Oct. 24, 1950         M. FISHBEIN         2,526,941

GAS TURBINE SYSTEM FOR AIRCRAFT PROPULSION

Filed June 10, 1948         4 Sheets-Sheet 2

INVENTOR.
MEYER FISHBEIN
BY
Herbert E. Metcalf
Attorney

Oct. 24, 1950 M. FISHBEIN 2,526,941
GAS TURBINE SYSTEM FOR AIRCRAFT PROPULSION
Filed June 10, 1948 4 Sheets-Sheet 3

INVENTOR.
MEYER FISHBEIN
BY Herbert E. Metcalf
Attorney

Oct. 24, 1950     M. FISHBEIN     2,526,941
GAS TURBINE SYSTEM FOR AIRCRAFT PROPULSION
Filed June 10, 1948     4 Sheets-Sheet 4

INVENTOR.
MEYER FISHBEIN
BY Herbert E. Metcalf
Attorney

Patented Oct. 24, 1950

2,526,941

UNITED STATES PATENT OFFICE 2,526,941

GAS TURBINE SYSTEM FOR AIRCRAFT PROPULSION

Meyer Fishbein, Los Angeles, Calif., assignor to Northrop Aircraft, Inc., Hawthorne, Calif., a corporation of California Application June 10, 1948, Serial No. 32,130

4 Claims. (Cl. 244—15)

My invention relates to gas turbine systems and more particularly to a gas turbine system wherein components may be separated without substantial loss in efficiency or significant increase in weight. Such a separation of components is highly desirable for proper weight distribution with respect to the center of gravity of an airplane, particularly those utilizing swept-back wings, with the turbine driving pusher propellers.

In equipping aircraft having swept-back wings with integral gaseous combustion turbines geared to drive pusher propellers, the proper distribution of mass with respect to the center of gravity of the airplane is difficult, and this is especially so when planforms of the swept-back all-wing type are used. As the power utilized in modern, large, high speed aircraft is constantly increasing, the propeller diameters may become so large that a conventional location chordwise, of the more outboard engines of a multi-engined airplane having swept-back wings, would cause the center of gravity of the airplane to move too far aft. Consequently, to achieve proper airplane balance for swept-back wing planforms the power plant should be located either at the leading edge of the wing or slightly forward thereof, with an extension shaft driving the propeller or propellers at the trailing edge of the wings through a gear box. The disadvantages of a system where a long extension shaft is used are clear, as such a shaft may have to transmit as much as 10,000 to 15,000 H. P. in large airplanes. Such shafts are heavy and tend to increase the overall power plant weight. The torsional vibration of a long power shaft driving large propellers also presents many difficulties to the power plant designer.

One of the objects of the present invention is to provide a means and method of separating components of a gas turbine propeller system so that the power plant mass can be advantageously distributed in wing planform with respect to the center of gravity of the airplane. In broad terms, the present invention utilizes a turbine driving a compressor capable of supplying a large excess of compressed air, this excess air being ducted to a combustion chamber, turbine and propeller assembly at a remote location. The propeller turbine can be relatively close to the propeller, thus eliminating the necessity for a long drive shaft, and the compressor turbine assembly can be located near the leading edge of the wing with the propeller turbine assembly located near the trailing edge of the wing, the two assemblies being connected only by an air duct. This divides the power plant mass advantageously with respect to the airplane center of gravity.

In this specification the gas turbine driving the large compressor to provide excess air will be termed the "compressor-turbine unit" and the turbine assembly connected to drive the propellers will be called a "power turbine unit."

An analysis has been made to determine the advantages and weight penalties involved in the comparison of a completely integrated gas turbine driving pusher propellers through a long extension shaft and gear box, with a separate compressor-turbine unit and a remote power turbine unit connected by an air duct. This analysis brings out a number of advantages in favor of the latter system while showing only a small weight penalty.

While the general advantage of separating the components of a gas turbine has been briefly mentioned above, this separation not only permits the center of gravity to be moved forward, but also permits a better installation within the wing profile. As the wing thickness is generally greatest near the wing root, the compressor-turbine unit can, in many instances, be installed near the fuselage or in the wing root with little or no wing surface protuberance. At the power-unit location the required space would normally fall within the wing and such fairing as would be employed to house the propeller shaft, thus cleaner aerodynamic design is possible.

Another distinct advantage for the remote power unit relates to turbine operating speeds. Since gas turbine compressors are normally required to be rotated at high speed, i. e., from 7,000 to 12,000 R. P. M. for good efficiency, this means that in an integrated unit the single or multiple stage turbine has to supply both compressor power and driving power and has to rotate at the required compressor speed. When a separate power unit is used, the power turbine can be made to operate at its own speed for best efficiency. This may be a slower speed than that of the compressor, resulting in lower blade and disc stresses. Furthermore, wider chord lengths can be used for the power unit turbine blades when operating at slower speeds, providing increased strength at little or no loss in thermodynamic efficiency. It is also possible, with a remote power unit, to operate the turbine over a wide speed range without substantial loss in efficiency, since turbine efficiency, with respect to R. P. M. change, is less sensitive than compressor efficiency.

Another and important advantage in using a remote power unit is that a much smaller amount of exhaust gas is produced by the power unit than the amount produced in an integrated system. In a conventional turbo-prop installation of the pusher type, all of the exhaust gases must be ducted either through or around the disc of propeller rotation. This is a serious problem and when the separate power unit is used as described herein, the volume of gas so required to be handled is greatly reduced.

Still another advantage lies in improved methods of operation of the power plant. The compressor-turbine, for example, can be kept at full power during landing procedures by by-passing some of the compressed air, thus permitting the power turbines to operate at rated R. P. M. but at reduced power. This excess air is then immediately available for fast increase in power of the power turbines if desired, as in the case of baulked landings.

The above and other objections and advantages can be more readily understood by reference to the drawings showing several embodiments of the present invention.

In the drawings, all of which are diagrammatic:

Figure 1:
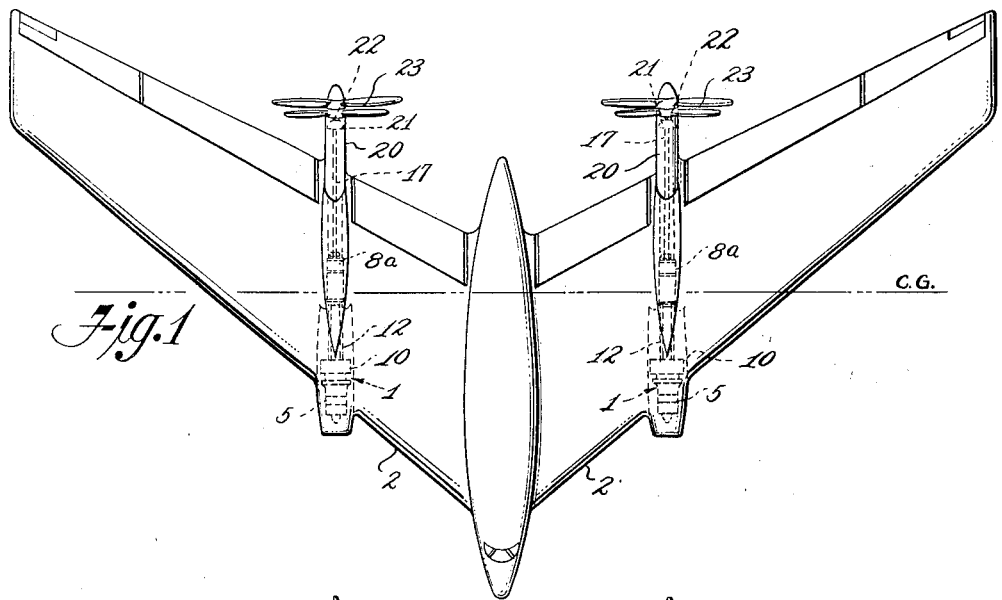
Figure 1 is a plan view of an all-wing type airplane with swept-back wing panels, showing the location of a power plant installation comprising a forward-mounted compressor-turbine unit and a remotely-positioned power turbine unit driving pusher propellers.
Figure 2:
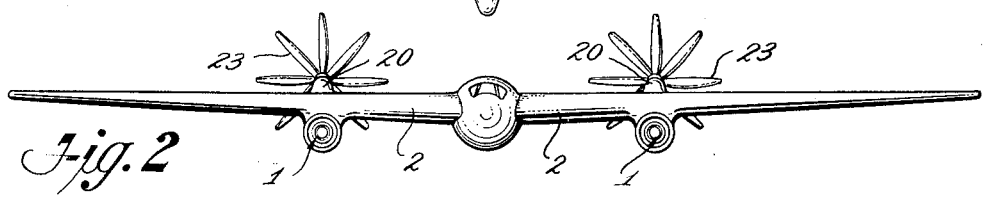
Figure 2 is a front view of the airplane shown in Figure 1, showing the vertical positioning of the power plant.
Figure 3:
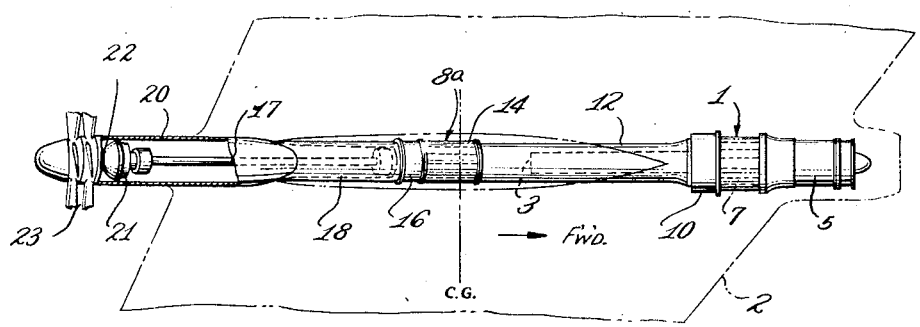
Figure 3 is a plan view showing one of the power plant installations of the airplane in Figures 1 and 2 on a larger scale.

One prop-jet arrangement is shown in Figures 1, 2, 3, 4 and 5. This arrangement is particularly designed for an all-wing airplane with a sharply swept-back wing, although it may be applied to other types of aircraft as well, and one or more power plant units may be used on each side of the airplane or completely enclosed within the fuselage envelope.

A compressor-turbine unit 1 is mounted at the wing leading edge 2, low enough so that the exhaust from the tailpipe 3 escapes below the lower wing surface 4, Figure 4. As shown in Figure 5, the compressor-turbine unit carries in its forward end an axial flow compressor 5 which supplies air to a set of fuel burners 6 in combustion chambers 7 located at the rear of the compressor 5, and also forces air through an annular space 8 outside of the combustion chambers 7. Hot gases from the combustion chambers drive a compressor-turbine 10 which is mounted on and connected to the same shaft 11 which turns the compressor 5. In this manner, the escaping jet of hot gases both provides a propelling force to the airplane and furnishes motive power for the compressor, as is well known in the art.

Figure 4:
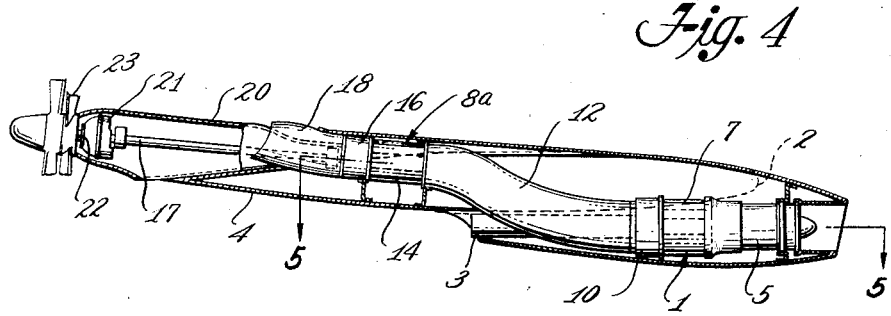
Figure 4 is a profile view of the power plant installation shown in Figure 3.
Figure 5:
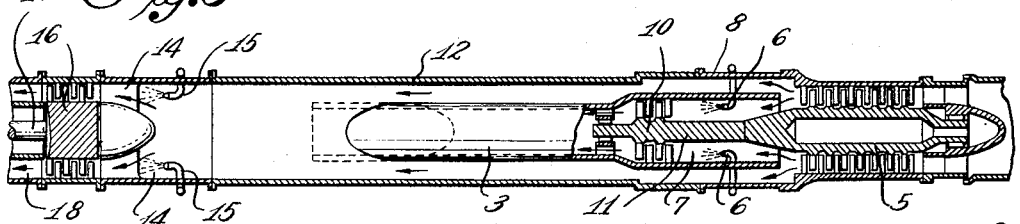
Figure 5 is a diagram, partly in cross-section and partly in plan, showing the relationship of the internal parts of the power plant shown in Figures 3 and 4.

Compressed air not supplied to the burners 7 is forced through the annular space 8 around the combustion chambers 7, along a duct 12 which curves upwardly into the wing, this duct 12 being sealed around the tailpipe 3 which projects straight out the rear of the compressor-turbine unit (Figure 4). Upon nearing the fore-and-aft center of gravity line (C. G.), as shown in Figure 1, all air in the duct 12 enters a power turbine unit 8a through power combustion chambers 14 where the air is heated by power fuel burners 15 to drive a power turbine 16 keyed to a propeller shaft 17. Substantially, all energy is removed from the gases in passing through power turbine 16, and the exhaust then escapes to the atmosphere through an exhaust duct 18 around the propeller shaft fairing 20.

A propeller gear box 21 is mounted at the aft end of the propeller shaft 17 driven by power turbine 16. The propeller shaft 17 turns the customary reduction gears (not shown) enclosed in the gear box 21 and these gears in turn drive output shafts 22 upon which are preferably mounted counter-rotating pusher propellers 23, although a single propeller may be used if desired, with the proper gear box.

Any desired ratio of jet power to propeller power can be built into the system by controlling the amount of energy removed from the gases by the compressor-turbines; however, one preferred embodiment of this arrangement would be to use 5% of the net total power for jet propulsion and 95% for propeller driving purposes.

From the above description, it will be seen that the weight of the power plant installation (compressor, power unit, gear box and propellers) is distributed on each side of the center of gravity of the airplane, a desirable condition for airplanes with swept-back wings, in order that the power plant C. G. may not fall too far aft of the airplane C. G.

Also, as explained above, only those gases discharged from the power turbine unit will pass through the propellers. In a power plant installation of the type herein described, this latter amount of exhaust may comprise only approximately 40% of the total quantity of exhaust gas, approximately 60% being required to operate the compressor-turbine-jet unit. These latter gases are exhausted below and well forward of the propeller and do not interfere with propeller action. In some cases, notably Figure 7, exhaust gases from the compressor unit are at one side of the propeller path, and thus cannot interfere with propeller action.

Figure 6:
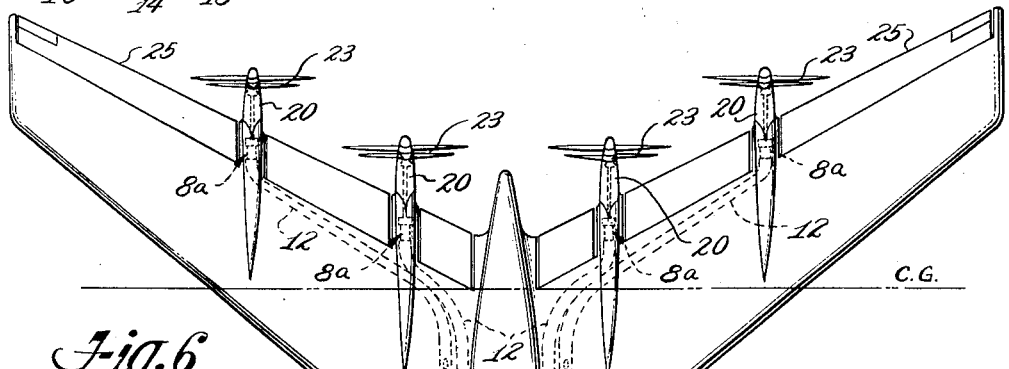
Figure 6 is a plan view of an all-wing airplane with swept-back wing sections, showing the location of its power plant installation comprising forward-mounted compressor-turbine units located inside the wing near the wing root section, and ducts leading to remotely-positioned power turbine units driving pusher propellers.
Figure 7:
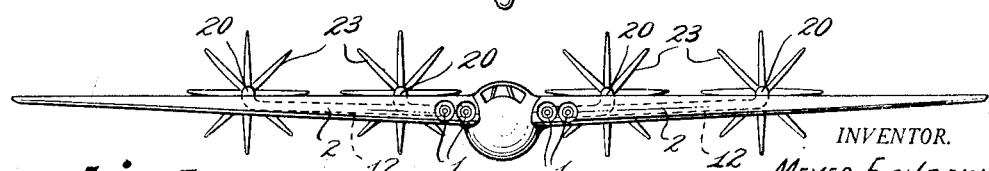
Figure 7 is a front view of the airplane shown in Figure 6, showing the vertical positioning of the power plants.
Figure 8:
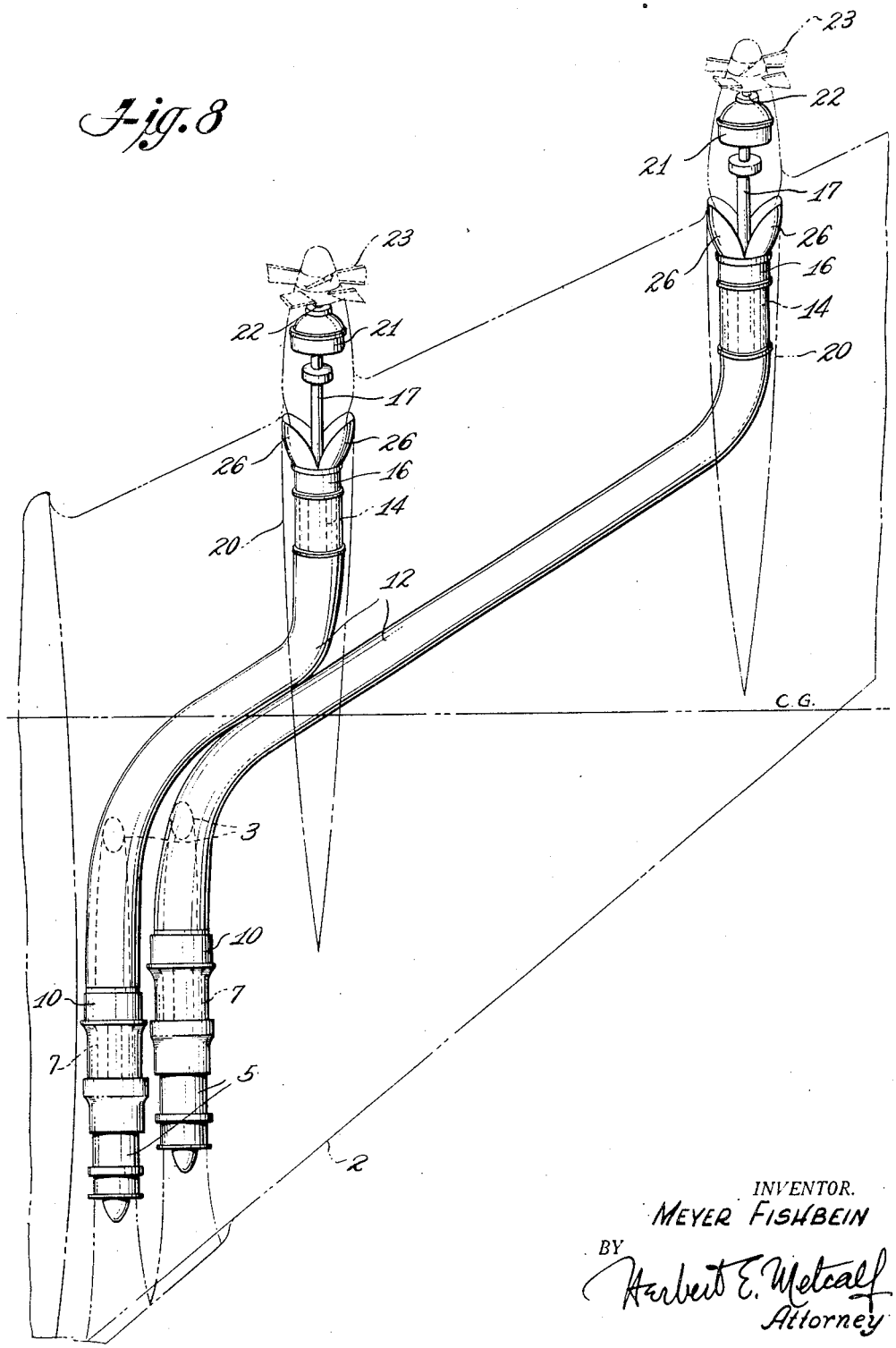
Figure 8 is a plan view showing two of the power plant installations of the airplane in Figures 6 and 7 on a larger scale.

Figures 6, 7 and 8 illustrate turbo-prop systems wherein two composite units are used on each wing panel. The compressor-turbine units are located close to the wing root, and are completely enclosed within the wing structure, thus materially reducing wing drag due to engine and duct protuberances were these units located outboard. In this case, the tailpipes 3 are inclined slightly downward permitting the exhaust to discharge through the lower wing surface. Since little thrust will be obtained by exhausting in this manner, the compressor-turbine 10 is designed to use substantially all the energy of the hot combustion products. As in the first arrangement, more air is supplied by the compressor 5 than is used in the combustion chambers 7, and the excess compressed air flows along ducts 12 curving in an outboard direction within the wing, to the power turbine units which drive propeller shafts 17 extending aft from the wing trailing edge 25. The power turbines 16 again convert as much as possible of the heat energy into rotational energy, and the gases from each turbine are exhausted at low velocity through twin exhaust ducts 26 on either side of the propeller shaft housing. This arrangement possesses all the advantages of the first construction, but permits a somewhat cleaner aerodynamic design.

Figure 9:
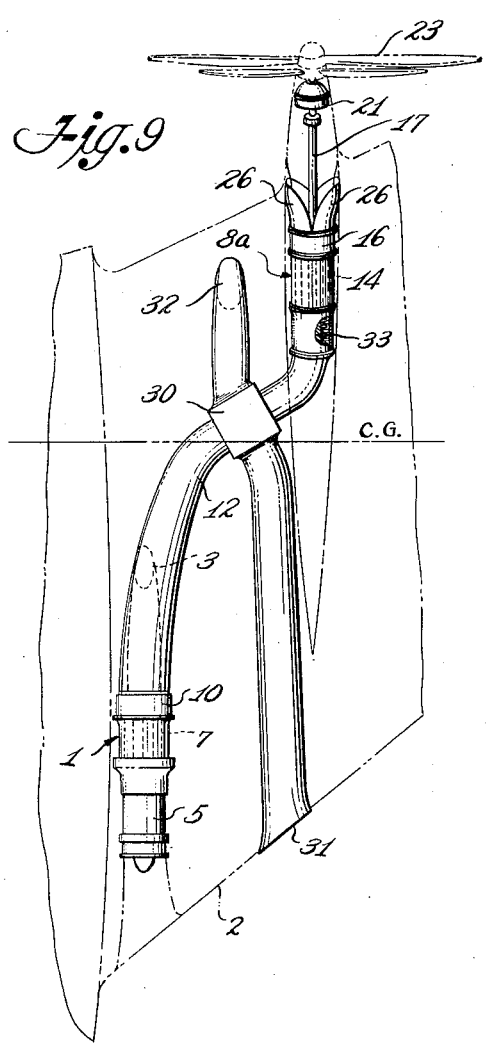
Figure 9 is a plan view showing a power plant similar to those in Figures 3, 4 and 8, but with an added intercooler, auxiliary compressor, and waste gate.
Figure 10:
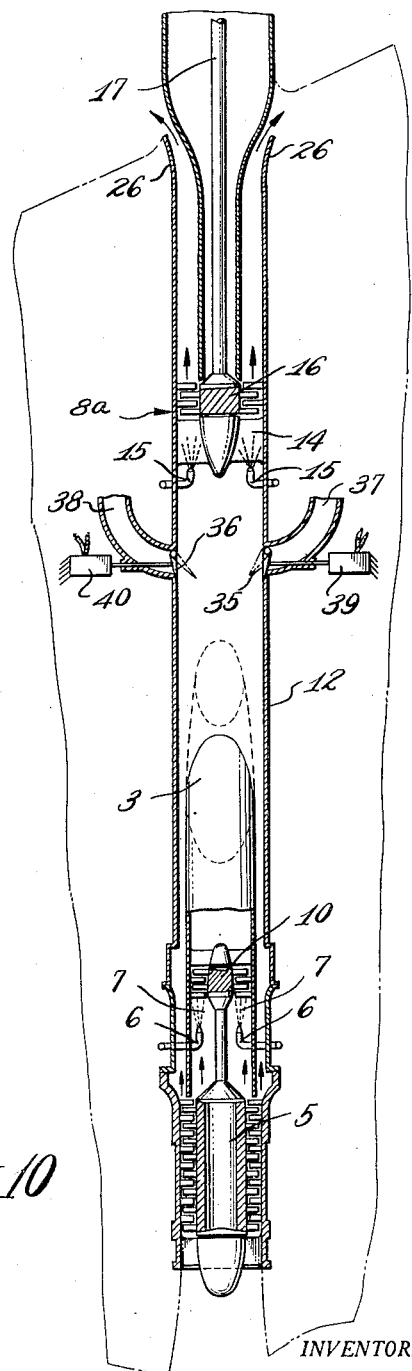
Figure 10 is a diagram, partly in cross-section and partly in plan, showing the relationship of the internal parts of the power plant shown in Figure 9.

Figures 9 and 10 show a modification of the present invention which may be incorporated wholly or in part in either of the two fore-going arrangements. In the construction, shown in Figure 9, heat of compression is removed from the excess compressed air by passing this air through an intercooler 30 installed in the duct 12. The intercooler 30 is supplied by cold ram air which enters through an inlet 31 in the wing leading edge 2 and, after picking up heat from the excess compressed air, exhausts through an outlet 32 in the wing lower surface. The temperature of the ducted compressed air is thus lowered, and consequently a slight drop in its pressure occurs, so that a second compressor may be effectively used at the power turbine location. This auxiliary compressor 33 is mounted on a forward extension of the power turbine shaft, and is driven by the power turbine 16. Thus, by cooling and recompressing the air, the advantages of intercooling are made available to the power turbine unit, and further, a good balance about the center of gravity can still be obtained.

The present invention, with separate power turbine and compressor-turbine unit will permit power variations as rapidly as can be handled by the propeller pitch change mechanism. One manner by which this can be accomplished is shown diagrammatically in Figure 10 which will next be referred to.

Installed in the duct 12 forward of the power turbine unit 8a of each power plant is a waste gate consisting of two waste flaps 35 and 36, which cover an opening in each side of the duct. Each flap is hinged at its rear edge and mounted to rotate inwardly to divert a portion of the ducted compressed air outside the duct, where it flows through pipes 37 and 38 respectively, to be discharged to the atmosphere. The flaps are connected to waste gate actuators 39 and 40 respectively, which are preferably electrically operated, attached to the aircraft structure at their outer ends. Both actuators 39 and 40 are preferably operated by a single control (not shown) by the pilot or flight engineer of the airplane for the purpose of opening and closing the flaps.

The operation of the waste gates is combined with a changing of the propeller blade angles, which are preferably fully adjustable to a reverse pitch position, and with the regulation of the fuel supply to the burners 15 of the power turbine unit 8a to achieve very valuable modes of operation, as will now be described.

For example, when the airplane is flying slowly during a landing approach, it may be highly desirable to attain full thrust from the engines quickly. Using the presently described method during such a circumstance, the compressor-turbine unit will be left at full power and R. P. M. while the power turbine unit is permitted to revolve substantially at the full R. P. M., but at low power, as loss of thrust is obtained by turning the propeller blades to an angle at or near the zero-thrust pitch. The decrease in power applied to the propeller shaft in this case is achieved by opening the above described waste gates to vent the excess compressed air not required, and by reducing the fuel input of the power turbine unit to the proper amount in accordance with the reduced flow of incoming air.

Obtaining full thrust from no thrust then merely involves the simultaneous addition of more fuel, closing of the waste gate, and the shifting of propeller blades to normal pitch, which will require less than two seconds. This short time is possible because the power unit is already turning at rated R. P. M. and does not require acceleration time, and as the compressor unit is always operating at full power, the proper amount of combustion air is instantly available. The three operations mentioned above are preferably incorporated into a single control, for simplicity, with a range of positions between the extreme end points, for good sensitivity in throttling.

A slightly different mode of operation can be obtained by maintaining the full thrust angle on the propeller, and throttling the power turbine to idling R. P. M., meanwhile maintaining the compressor-turbine unit at full power, with the air not required by the power turbine being vented by the waste gates. In this case, the waste gates are closed as fuel is fed to the power unit combustion chambers and the power turbine and attached propellers rapidly accelerated as no delay is necessary to accelerate the compressor which is already operating at full power and full R. P. M.

The weight penalties involved in separating the power plant elements are relatively small. For example, assume an airplane, with an outline similar to that shown in Figure 6, having an all-up weight of 300,000 pounds, a wing area of 5,000 square feet, an aspect ratio of 5, a taper ratio of 2.5 and using four power plants of 10,000 horsepower each. One power plant arrangement of Figures 6, 7 and 8 is compared with a completely integrated gas turbine positioned at the leading edge of the wing driving a long propeller shaft extending to the gear box aft of the wing trailing edge. For the integrated system a tubular propeller shaft 28 feet in length would be required. A shaft only eight feet long would be required for the presently described ducted arrangement, thus 20 feet more shafting is required when using the integrated power plant. The shaft would be approximately 6 inches in diameter with a wall thickness of ¼ inch, weighing 15 pounds per foot length, or about 300 pounds for the 20 feet. Adding 150 pounds for shaft supports and bearings gives 450 pounds. This is all the structure that the integrated arrangement would contain which would not appear in the ducted arrangement.

The extra weight involved in the ducted arrangement will be outlined. Considering the ducting, a length of 80 feet would be required to connect the compressor-turbine unit to the most outboard power turbine unit. At 2 pounds per foot length, this duct would weigh 160 pounds. The duct loss (power) is less than 1%. For the power turbine unit, the weights can be assessed at 40 pounds for combustion chambers, 450 pounds for the turbine disc and associated parts, and 100 pounds for supports, totaling 750 pounds. These weights are over and above any reductions in weight of comparable components which become possible in the compressor-turbine unit. Thus a difference of 750—450, or 300 pounds penalty per power plant in weight would be incurred by using the present system rather than the integrated type. Considering that the power plant specific weight is about ½ pound per horsepower, making a weight of 5,000 pounds, this 300 pounds penalty amounts to only about a 6% increase over the integrated power plant. This weight analysis may be summarized as follows:

Extra weight peculiar to integrated power plant:

| | Pounds |
|---|---|
| Propeller shaft | 300 |
| Propeller shaft supports | 150 |
| | 450 |

Extra weight peculiar to ducted power plant:

| | Pounds |
|---|---|
| Duct | 160 |
| Combustion chambers | 40 |
| Turbine disc | 450 |
| Supports | 100 |
| | 750 |

Net difference=750—450=300 pounds. The inboard power plant weight penalty is only about 150 pounds.

Even with these small weight disadvantages, the advantages mentioned above make the present invention more desirable than a single power unit at the wing leading edge driving a long propeller shaft. In fact, turbo-pusher-prop designs, for all-wing airplanes using the ducted method described herein, become highly practical. Considered as a whole, the advantages of the separated system as described herein far outweigh the relatively small weight and power penalties involved.

What is claimed is:

1. In an airplane propelling system, a combustion gas power turbine located adjacent the trailing edge of a wing of said airplane, a pusher propeller mounted behind the trailing edge of said wing and connected by a shaft to said power turbine, a power turbine combustion chamber connected to said power turbine, an air compressor located adjacent and below the leading edge of said wing and directly connected to a compressor turbine, a compressor turbine combustion chamber connected to said compressor turbine, means for supplying part of the compressor air to said power turbine combustion chamber, means for supplying the remainder of said compressor air to said compressor turbine combustion chamber, the total supply of compressor air being sufficient to operate both turbines under full load, and an exhaust gas duct from said compressor turbine extending straight aft beneath said wing, said compressor turbine being bladed to pass a significant amount of energy into said exhaust duct to produce a jet thrust.

2. In an airplane propelling system, a combustion gas power turbine, a pusher propeller mounted behind the trailing edge of a wing of said airplane and connected by a shaft to said power turbine, a power turbine combustion chamber connected to said power turbine, an air compressor remotely located from said power turbine and directly connected to a compressor turbine, a compressor turbine combustion chamber connected to said compressor turbine, duct means for supplying part of the compressor air to said power turbine combustion chamber, means for supplying the remainder of the compressor air to said compressor turbine combustion chamber, the total supply of compressor air being sufficient to operate both turbines under full load, and a waste gate in said duct to vent air from said compressor to the atmosphere.

3. Apparatus in accordance with claim 2 wherein said propeller is provided with blades featherable in accordance with the opening of said waste gate to maintain a constant speed of said power turbine independent of the thrust load thereon.

4. In a propelling system for an airplane having swept-back wings, a combustion gas power turbine located in a wing of said airplane a substantial distance outboard of the root of said wing, a pusher propeller mounted behind the trailing edge of said wing and connected by a shaft to said power turbine, a power turbine combustion chamber connected to said power turbine, an air compressor mounted close to the root of said wing and having an air intake adjacent the leading edge of said wing, said compressor being directly connected to a compressor turbine positioned immediately aft of said air compressor, a compressor turbine combustion chamber connected to said compressor turbine, duct means for supplying part of the compressor air to said power turbine, and means for supplying the remainder of said air to said power turbine combustion chamber, the center of gravity of said power turbine being aft of the center of gravity of said airplane with the center of gravity of the connected compressor and compressor turbine being forward of the center of gravity of said airplane.

MEYER FISHBEIN.

REFERENCES CITED

The following references are of record in the file of this patent:

UNITED STATES PATENTS

| Number | Name | Date |
|---|---|---|
| 1,980,233 | Stout | Nov. 13, 1934 |
| 2,368,501 | Thompson | Jan. 30, 1945 |
| 2,411,227 | Planiol et al. | Nov. 19, 1946 |

FOREIGN PATENTS

| Number | Country | Date |
|---|---|---|
| 409,498 | Great Britain | May 3, 1934 |
| 526,104 | Great Britain | Sept. 11, 1940 |
| 586,572 | Great Britain | Mar. 24, 1947 |